United States Patent
Cesarano et al.

(10) Patent No.: US 10,131,252 B2
(45) Date of Patent: Nov. 20, 2018

(54) REAR-SEAT ASSEMBLY OF A MOTOR VEHICLE

(71) Applicant: FCA Italy S.p.A., Turin (IT)

(72) Inventors: Antonio Cesarano, Turin (IT); Gianfranco Del Nero, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/493,238

(22) Filed: Apr. 21, 2017

(65) Prior Publication Data

US 2017/0320410 A1 Nov. 9, 2017

(30) Foreign Application Priority Data

May 5, 2016 (EP) .................................... 16168486

(51) Int. Cl.
| | | |
|---|---|---|
| B60N 2/30 | (2006.01) | |
| B60N 2/68 | (2006.01) | |
| B60N 2/015 | (2006.01) | |
| B60N 2/36 | (2006.01) | |

(52) U.S. Cl.
CPC .......... *B60N 2/3013* (2013.01); *B60N 2/015* (2013.01); *B60N 2/01508* (2013.01); *B60N 2/01558* (2013.01); *B60N 2/36* (2013.01); *B60N 2/682* (2013.01); *B60N 2002/684* (2013.01); *B60N 2205/35* (2013.01)

(58) Field of Classification Search
CPC .............................. B60N 2/3013; B60N 2/682
USPC ....... 296/66, 65.09, 65.05, 65.01, 65.16, 63, 296/65.03
See application file for complete search history.

(56) References Cited

U.S. PATENT DOCUMENTS

| | | | | |
|---|---|---|---|---|
| 4,200,329 A | * | 4/1980 | Inami | .................. B60N 2/3015 296/69 |
| 4,368,557 A | * | 1/1983 | Inasawa | ................ B60N 2/015 16/263 |

(Continued)

FOREIGN PATENT DOCUMENTS

| | | |
|---|---|---|
| DE | 102005029649 A1 | 12/2006 |
| JP | S53144717 | 11/1978 |
| JP | S60157437 U | 10/1985 |

OTHER PUBLICATIONS

European Search Report dated Nov. 16, 2016, for European Application No. 16168486.5, 5 pages.

*Primary Examiner* — D Glenn Dayoan
*Assistant Examiner* — E Turner Hicks
(74) *Attorney, Agent, or Firm* — RMCK Law Group PLC

(57) ABSTRACT

A rear-seat assembly, comprising a backrest, a transverse pin for articulation of the backrest, and a pair of brackets fixed by welding to respective rear wheelhouses. Each bracket comprises a fixing plate and a central bracket body, which are constituted by two separate components of sheet metal having different thicknesses and fixed together by welding. The fixing plate has front and rear surfaces contacting an inner surface portion of the wheelhouse, and the central bracket body is substantially C-shaped with a central wall and two side walls, which are bent with respect to the central wall and have respective front edges welded to the fixing plate front surface. The central wall has an opening for insertion and blocking of one end of the transverse pin having an internal edge that is not bent, with a thickness equal to the thickness of the central bracket body.

5 Claims, 6 Drawing Sheets

(56) References Cited

U.S. PATENT DOCUMENTS

| | | | | |
|---|---|---|---|---|
| 5,015,026 A * | 5/1991 | Mouri | ............... | B60N 2/3013 296/65.09 |
| 5,263,763 A * | 11/1993 | Billette | ............... | B60N 2/3013 296/63 |
| 5,273,336 A * | 12/1993 | Schubring | ............... | B60N 2/366 296/63 |
| 6,073,986 A * | 6/2000 | Neale | ............... | B60N 2/3015 296/63 |
| 6,209,943 B1 * | 4/2001 | Neale | ............... | B60N 2/3015 296/65.01 |
| 7,581,793 B2 * | 9/2009 | Hartmann | ............... | B60N 2/3013 296/65.03 |
| 8,820,814 B2 * | 9/2014 | Asai | ............... | B60N 2/015 296/63 |

* cited by examiner

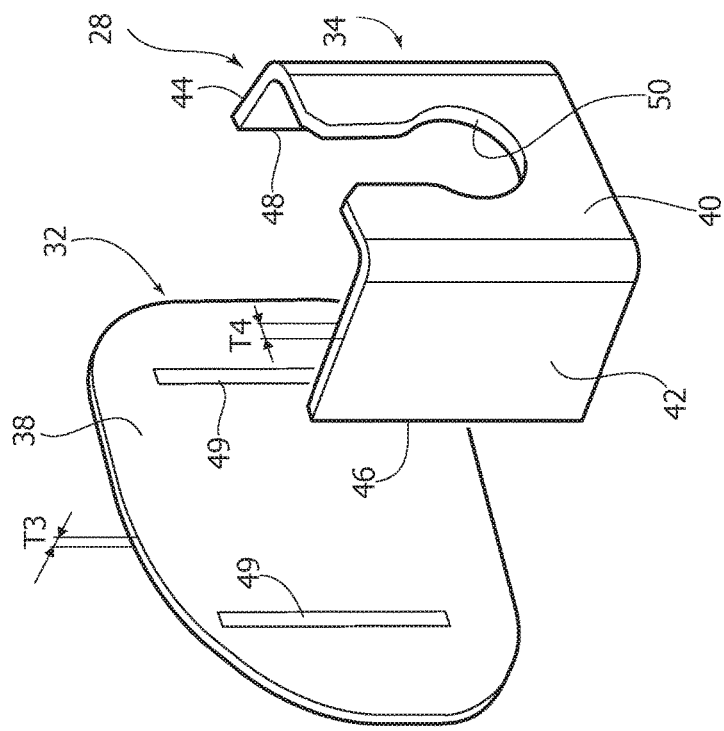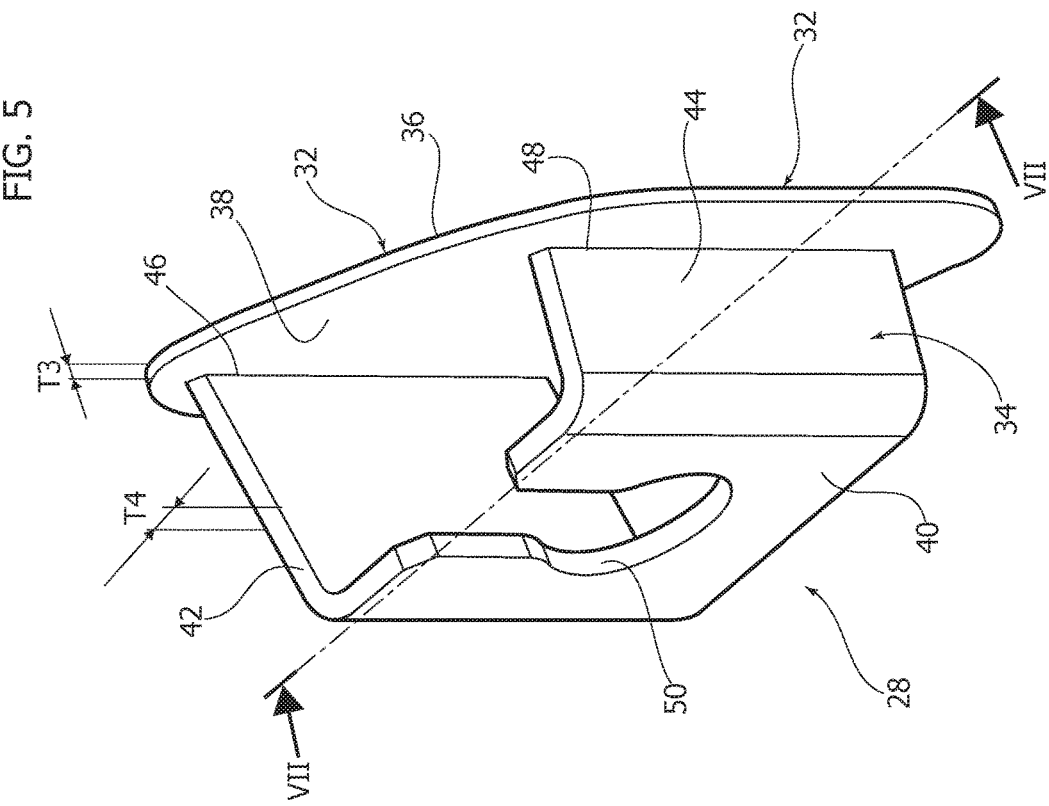

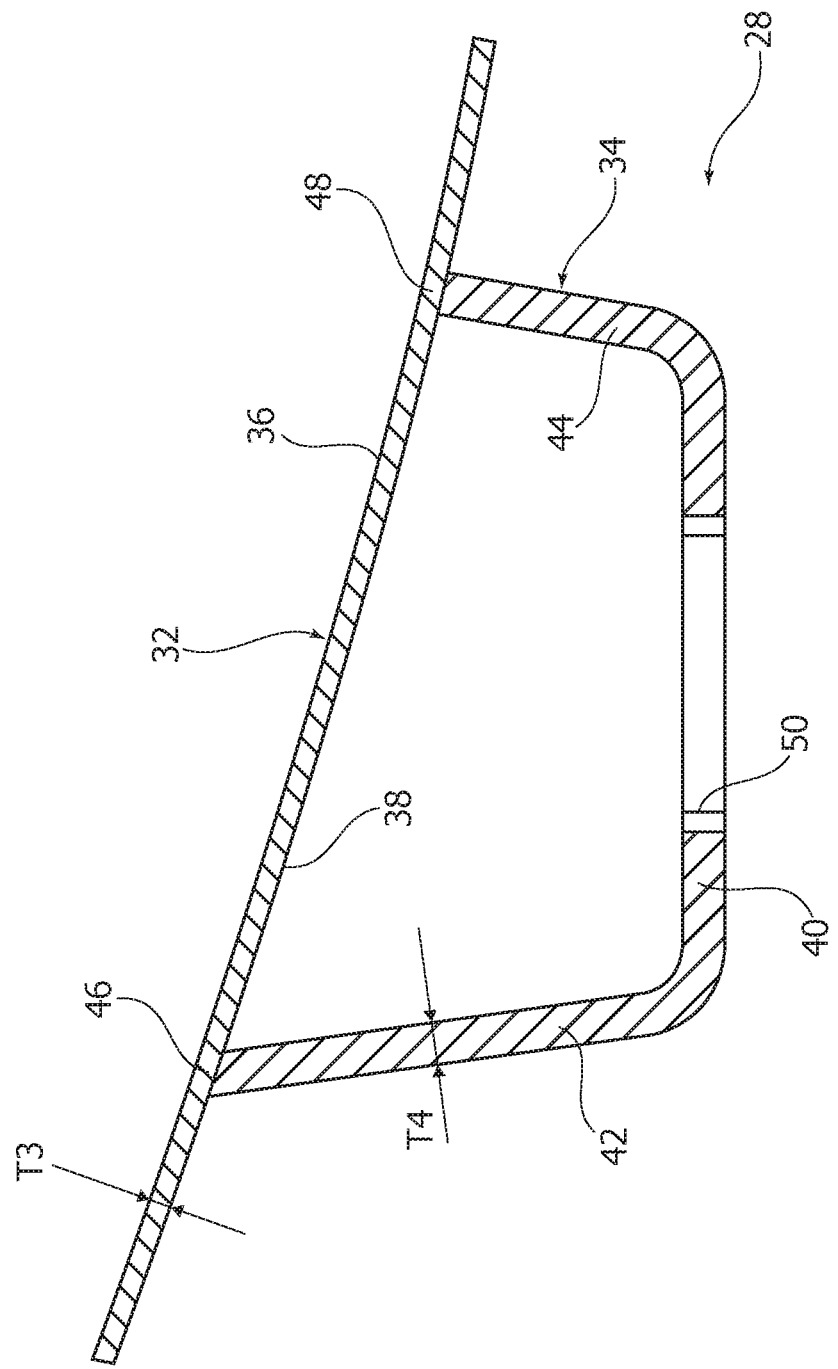

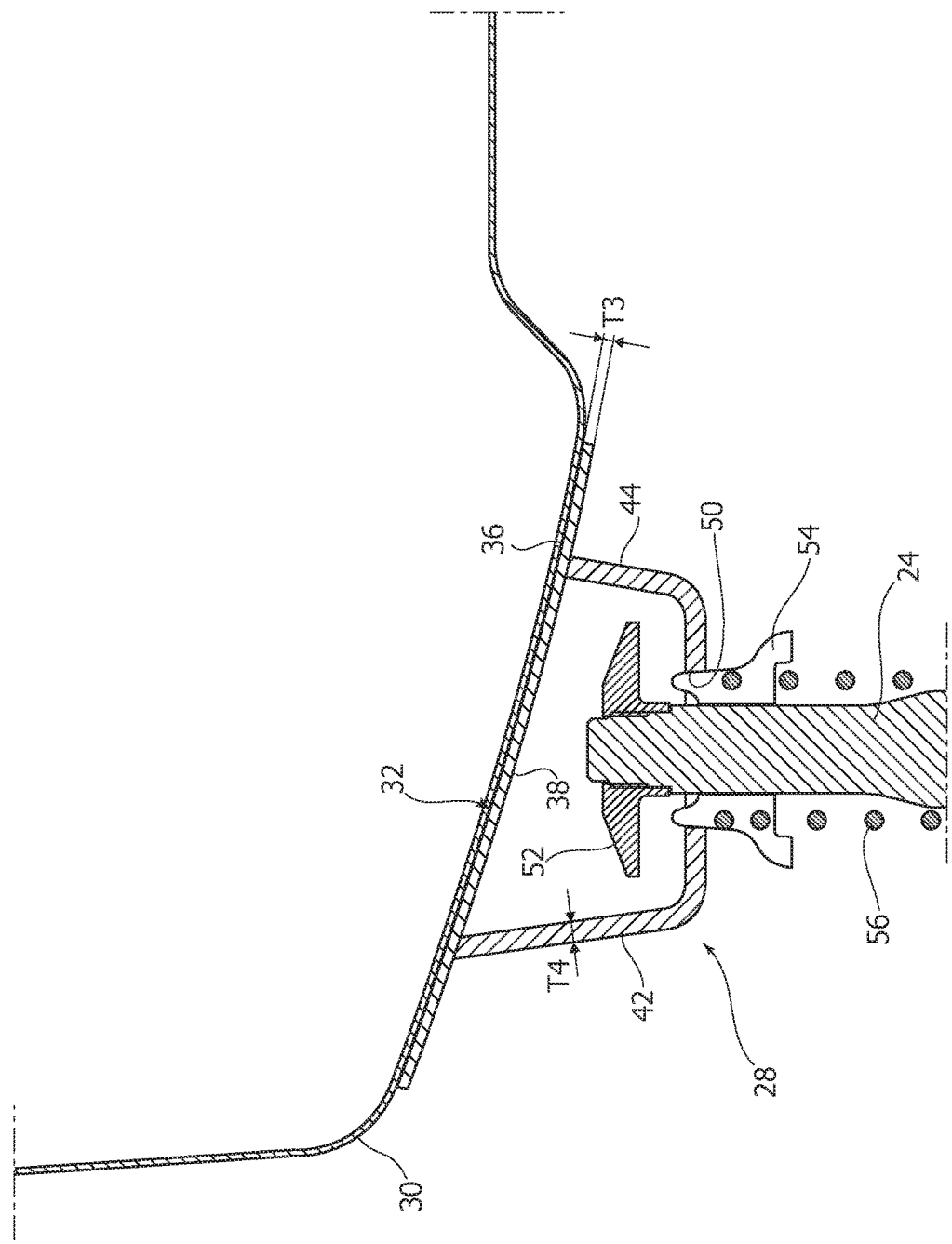

_(1)_

REAR-SEAT ASSEMBLY OF A MOTOR VEHICLE

CROSS REFERENCE TO RELATED APPLICATIONS

This application claims priority to European Patent Application No. 16168486.5 filed on May 5, 2016, the entire disclosure of which is incorporated herein by reference.

FIELD OF THE INVENTION

The present invention relates to a rear-seat assembly of a motor vehicle, comprising a transverse pin for articulation between the backrest and the seat and a pair of brackets for attachment of the transverse pin to the body of the motor vehicle.

More precisely, the invention regards brackets for attachment of the transverse pin to the body of the motor vehicle.

PRIOR ART

Generally, the rear-seat assembly of a motor vehicle comprises a seat fixed with respect to the body of the vehicle and a backrest articulated about a transverse pin between an upright position and a knocked-down position. The backrest is frequently formed by two transverse sections that oscillate independently of one another about said transverse pin for knocking down the two portions of backrest separately. The pin extends in a transverse direction between two opposite sides of the body. The opposite ends of the transverse pin are connected to the body of the vehicle via two attachment brackets, which are fixed by welding to the vehicle body, generally in positions corresponding to the rear wheelhouses.

FIG. 1 of the attached drawings is a schematic illustration of the area of attachment of one end of a pin for articulation of the backrest according to the known art. In FIG. 1 designated by 10 is the pin for articulation of the backrest, which extends in a transverse direction between two opposite sides of the vehicle body 12. Each end of the articulation pin 10 is connected to the body 12 via a respective bracket 14, which is welded to a respective rear wheelhouse 16.

With reference to FIG. 2, a bracket 14 according to the known art comprises an outer flange 18 and a projecting central body 20 made of a single piece of stamped sheet metal. The outer flange 18 is fixed by welding to the rear wheelhouse 16. The projecting central body 20 has an opening 22 engaged in which is the corresponding end of the transverse pin 10. The opening 22 has an area of larger diameter and an area of smaller diameter, for insertion and for blocking, respectively, an end head of the pin 10.

To ensure that the ensemble formed by the rear seat and the backrest is held in place in the event of impact, calculations and experimental analyses show that a minimum thickness of contact of 3 mm is necessary between the wall of the opening 22 and the pin 10. As shown in FIG. 3, in the known solutions adopted by the present applicant, the bracket 14 has a constant thickness T of 1.5 mm, and the opening 22 has an edge 24 bent inwards in such a way that the wall of the opening in contact with the end of the pin 10 will have a thickness T1 equal to or greater than 3 mm.

The bent edge 24 entails a certain complexity of the dies for stamping the attachment brackets. Moreover, the attachment brackets are as a whole relatively heavy. A further problem of the brackets according to the prior art is that the brackets must be customized according to the model of motor vehicle. Dedicated stamping equipment is consequently necessary for the various models of motor vehicle.

OBJECT AND SUMMARY OF THE INVENTION

The object of the present invention is to provide a rear-seat assembly of a motor vehicle equipped with improved brackets for attachment of the rear-seat assembly to the body of the motor vehicle.

In particular, the object of the invention is to provide improved attachment brackets that will enable a stamping process that is simpler than the one used for brackets of a known type, a reduction in weight, and a better modularity.

According to the present invention, the above objects are achieved by a rear-seat assembly of a motor vehicle presenting the characteristics that form the subject of claim 1.

The claims form an integral part of the teaching provided herein in relation to the invention.

BRIEF DESCRIPTION OF THE DRAWINGS

Further characteristics and advantages of the invention will emerge from the ensuing description, with reference to the annexed drawings, which are provided purely by way of non-limiting example and in which:

FIG. 5 is a perspective view of the bracket indicated by the arrow V in FIG. 4;

FIG. 6 is an exploded perspective view of the bracket of FIG. 5;

FIG. 7 is a cross section of the bracket according to the line VII-VII of FIG. 5; and FIG. 8 is a cross section of the bracket according to the line VIII-VIII of FIG. 4.

DESCRIPTION OF A PREFERRED EMBODIMENT

Figure 2:
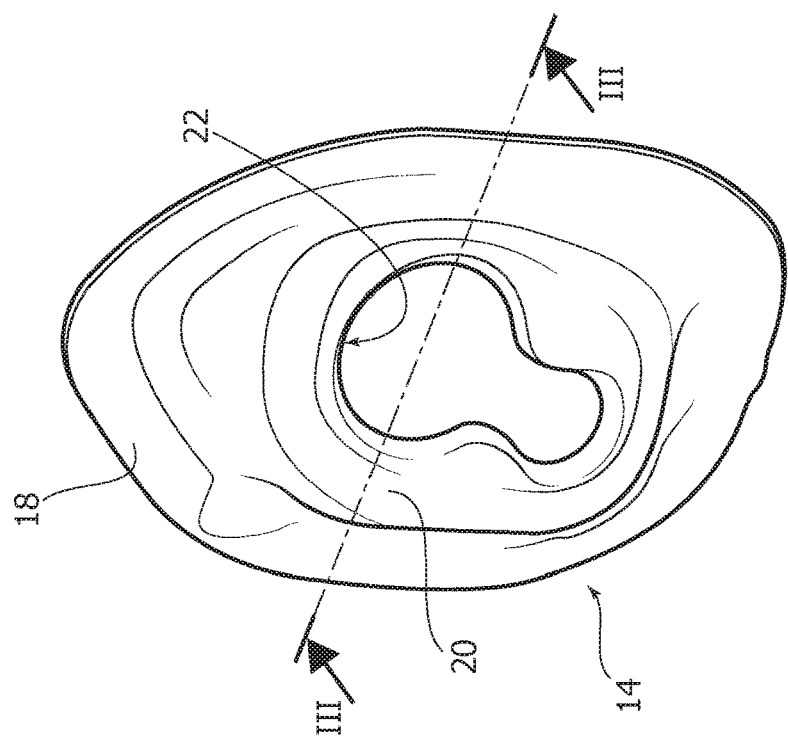
FIGS. 1, 2, and 3, already described previously, illustrate a bracket according to the known art for attachment of a rear-seat assembly to the body of a motor vehicle.
Figure 1:
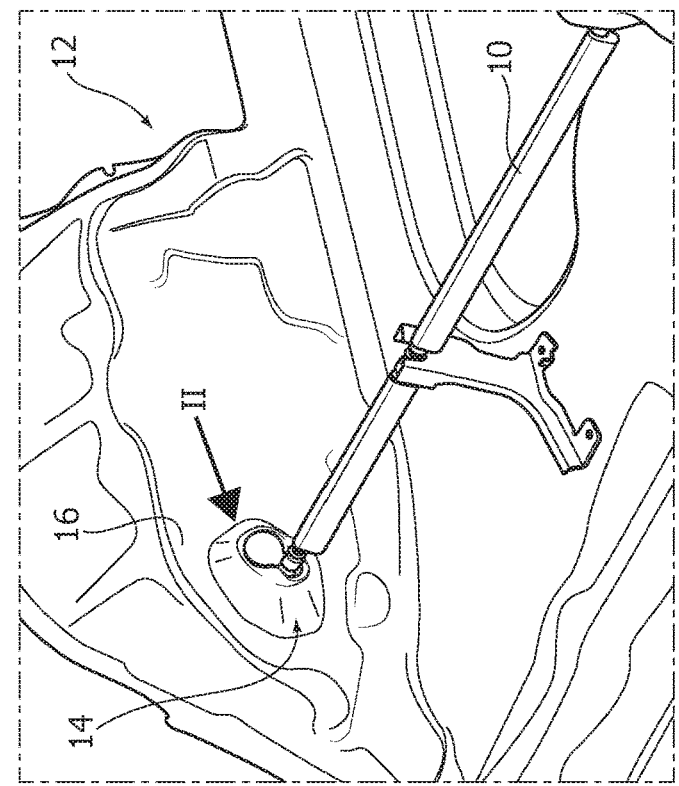
Figure 3:
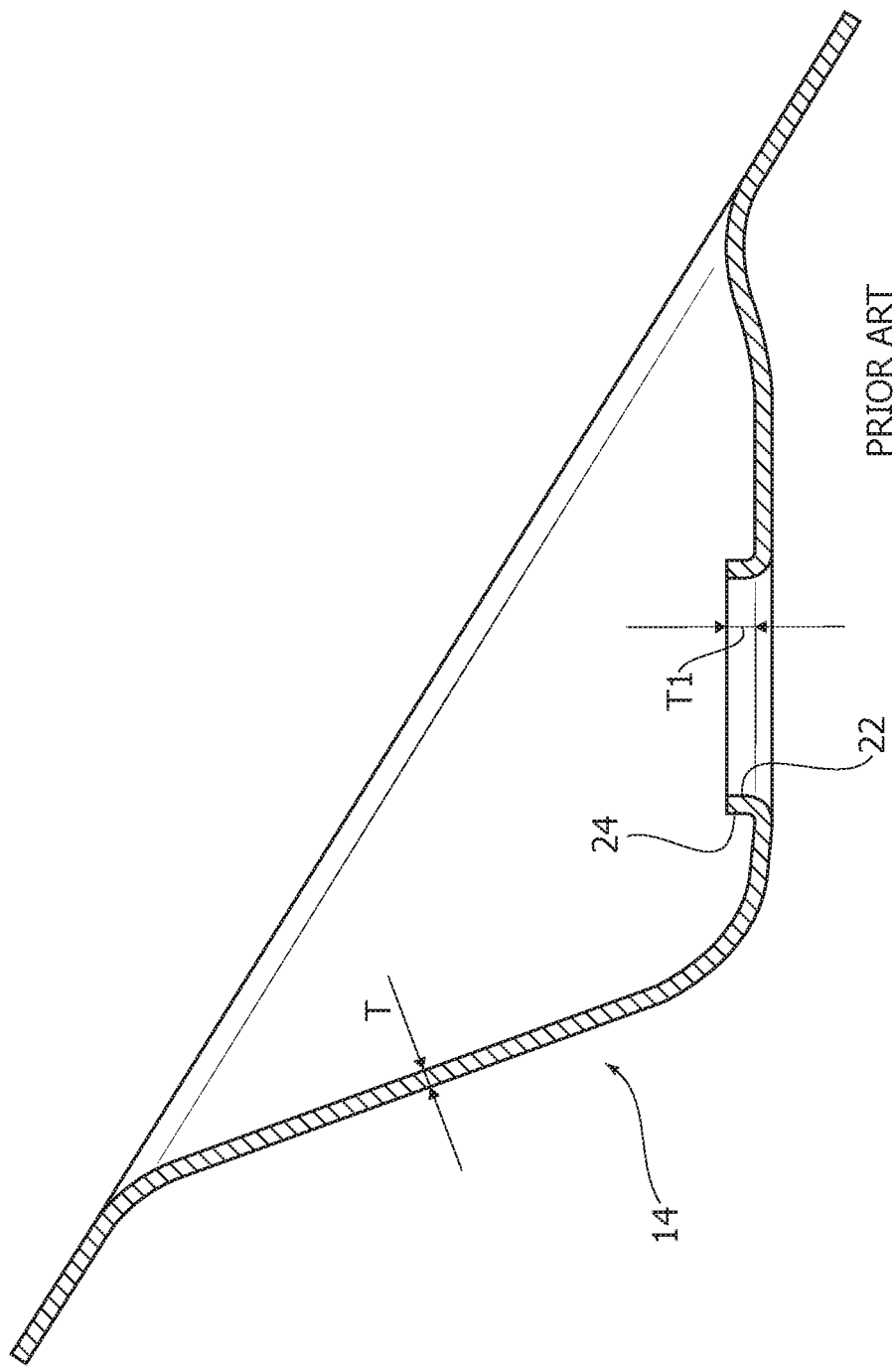
Figure 4:
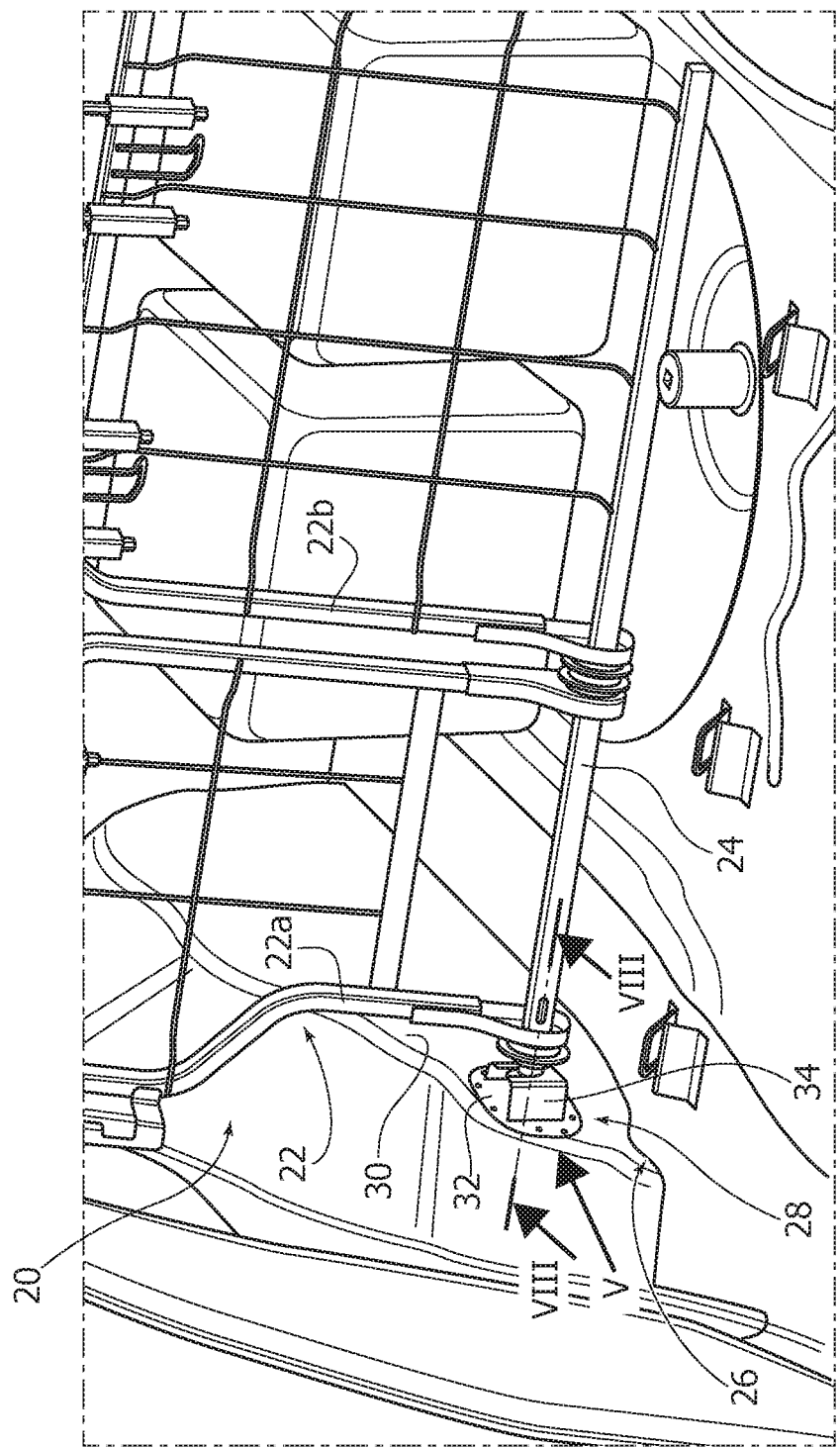
FIG. 4 is a partial perspective view of a rear-seat assembly of a motor vehicle according to the present invention.

With reference to FIG. 4, number 20 designates as a whole a rear-seat assembly of a motor vehicle. In FIG. 4 some components have been omitted for greater clarity. In particular, part of the sitting surface of the rear-seat assembly 20 is not represented.

The rear-seat assembly 20 comprises a backrest 22. In FIG. 4 only the frame of the backrest 22 is illustrated, without any upholstery. The rear-seat assembly 20 comprises a transverse pin 24, which has the purpose of articulating the backrest 22 to the body 26 of the motor vehicle. In a conventional way, the backrest 22 comprises two sections 22a, 22b that oscillate independently of one another about the transverse pin 24 and are mobile between an upright position and a knocked-down position.

The ends of the transverse pin 24 are connected to the body 26 via a pair of brackets 28, one of which is visible in FIG. 4. The brackets 28 are fixed by welding to respective rear wheelhouses 30.

With reference to FIGS. 5-8, each bracket 28 comprises a fixing plate 32 and a central bracket body 34, which are constituted by two separate components of sheet metal and are fixed together by welding. The fixing plate 32 and the central bracket body 34 have respective thicknesses T3 and T4 that are different from one another. The thickness T3 of the fixing plate 32 is substantially smaller than the thickness T4 of the central bracket body 34. In particular, the thickness T3 of the fixing plate 32 is less than half the thickness T4 of the central bracket body 34. For example, the fixing plate 32 may have a thickness T3 of 1.2 mm, and the central bracket body 34 may have a thickness T4 of approximately 3 mm.

The fixing plate 32 has a slightly curved shape with constant thickness, with a rear surface 36 slightly concave and a front surface 38 slightly convex. The curvature of the rear surface 36 is complementary to the curvature of the part of the inner surface of the wheelhouse 30 on which the bracket 28 is to be fixed.

The central bracket body 34 is substantially C-shaped with constant thickness, with a central wall 40 and two side walls 42, 44 that are bent with respect to the central wall 40. The side walls 42, 44 have respective front edges 46, 48 that are fixed by welding to the front surface 38 of the fixing plate 32. In FIG. 6 the areas of fixing between the front edges 46, 48 and the fixing plate 32 are designated by 49. Preferably, welding between the edges 46, 49 and the fixing plate 38 is obtained by capacitive-discharge welding (CDW).

The central wall 40 of the central bracket body 34 has an opening 50 for insertion and blocking of one end of the transverse pin 24. The opening 50 has an internal edge that is not bent, with a thickness equal to the thickness T3 of the central bracket body 34. In the example illustrated, the opening has a circular portion in which the end of the transverse pin 24 is blocked, as illustrated in FIG. 8. The circular portion of the opening 50 is connected to an edge of the central wall 40 via a neck portion with a width smaller than the diameter of the circular portion.

The thickness T4 of the central bracket body 34 along the opening 50 is equal to or greater than the minimum dimension of contact with the end of the pin 24 necessary for ensuring that the rear backrest 22 remains firmly held in place in the event of impact.

As is illustrated in FIG. 8, each end of the transverse pin 24 has a head 52 that is housed in the space defined between the central bracket body 34 and the fixing plate 32. Mounted on the end portion of the pin 24 is a bushing 54, which is axially mobile and pushed outwards by a spring 56. Assembly is carried out by inserting from above the head 52 into the central bracket body 34 and causing the bushing 54 to recede against the action of the spring 56 so as to position the pin 24 in the circular portion of the opening 50. When the pin is properly positioned, the bushing 54 is released, and the spring 56 pushes the bushing 54 so that it engages with the edge of the opening 50, thus blocking the end of the pin 24 to the bracket 28.

As is evident from the foregoing description, the bracket 28 according to the invention achieves a series of important advantages.

In the first place, breaking-down of the bracket 28 into two pieces 32, 34 that are then welded together enables elimination of the need to bend the edge of the opening 50. Bending of the edge of the opening for engagement of the pin of the brackets according to the prior art is replaced by an increase in thickness of just the central bracket body 34. This solution enables a simplified stamping process. The equipment for stamping of the fixing plate 32 and of the central bracket body 34 are considerably simpler than the equipment necessary for stamping the brackets according to the known art, in particular because bending of the edges of the opening 50 is not envisaged.

Moreover, the solution according to the invention enables a considerable reduction in weight as compared to the solutions according to the prior art. All other conditions being the same, the overall weight of the brackets with the solution according to the present invention is 0.32 kg, whereas the solution according to the prior art entails an overall weight of the brackets of 0.65 kg.

A further advantage of the solution according to the invention is that the central bracket body 34 can be used as such for different models of motor vehicles, whereas the fixing plate 32 is customized according to the model of motor vehicle. The use of one and the same central bracket body 34 in a modular way enables further savings in the production of the brackets.

Of course, without prejudice to the principle of the invention, the details of construction and the embodiments may vary widely with respect to what has been described and illustrated purely by way of example herein, without thereby departing from the scope of the present invention.

What is claimed is:

1. A rear-seat assembly of a motor vehicle, comprising:
   a backrest,
   a transverse pin for articulation of the backrest to a body of the motor vehicle, and
   a pair of brackets fixed by welding to respective rear wheelhouses of the body of the motor vehicle,
   wherein each of said brackets comprises a fixing plate and a central bracket body, which are constituted by two separate and distinct components of sheet metal having thicknesses that are different from one another and are fixed together by welding,
   wherein the fixing plate has a concave front surface and a convex rear surface having a curvature complimentary to and in contact with an inner surface portion of the wheelhouse when welded thereto,
   wherein the central bracket body is substantially C-shaped with a central wall and two side walls, which are bent with respect to the central wall and have respective front edges fixed by welding to the front surface of the fixing plate,
   wherein the central wall of the central bracket body has an opening for insertion and blocking of one end of the transverse pin that has an internal edge that is not bent, with a thickness equal to the thickness of the central bracket body,
   wherein the fixing plate is a continuous plate having a size and shape such that the fixing plate extends beyond a top, a bottom and an outboard side of each of the two sidewalls, and
   wherein the fixing plate has a thickness of less than or equal to half a thickness of the central bracket body, thereby reducing weight of each of said pair of brackets.

2. The rear-seat assembly according to claim 1, wherein the thickness of the central bracket body is equal to or greater than 3 mm.

3. The rear-seat assembly according to claim 1, wherein welding between said front edges and the fixing plate is obtained by capacitive-discharge welding (CDW).

4. The rear-seat assembly according to claim 1, wherein said opening of the central wall of the central bracket body has a circular portion connected to a top edge of the central wall via a neck portion with a width smaller than a diameter of the circular portion.

5. A rear-seat assembly for one or more motor vehicle models, comprising:
   a backrest,
   a transverse pin for articulation of the backrest to a body of the one or more motor vehicle models, and a pair of brackets fixed by welding to respective rear wheelhouses of the body of each of the one or more motor vehicle models, wherein each of said pair of brackets includes a fixing plate and a central bracket body, which are constituted by two separate and distinct components of sheet metal having thicknesses that are different from one another and are fixed together by welding, wherein the fixing plate has a concave front surface and a convex rear surface having a curvature complimentary to and in contact with an inner surface portion of the wheelhouse of each of the one or more vehicle models when welded thereto, wherein the fixing plate is a continuous plate having a size such that the fixing plate extends beyond a top, a bottom and an outboard side of each of the two sidewalls, wherein the central bracket body is substantially C-shaped with a central wall and two side walls, which are bent with respect to the central wall and have respective front edges fixed by welding to the front surface of the fixing plate, wherein the central wall of the central bracket body has an opening for insertion and blocking of one end of the transverse pin that has an internal edge that is not bent, with a thickness equal to the thickness of the central bracket body, wherein the curvature of the rear surface of the fixing plate is customized to mate with a curvature of the respective wheelhouse that is different for each of the one of more vehicle models, whereas the central bracket body is non-customized such that a same central bracket body is used with each of the customized fixing plates, and wherein providing each bracket with a separate and distinct fixing plate and a separate and distinct central bracket body provides for i) the fixing plate having a thickness of less than or equal to half a thickness of the central bracket body, thereby reducing weight of each of said brackets; and ii) a reduction in an amount of customization of each of the pair of brackets required for each of the one or more vehicle models.

\* \* \* \* \*